(12) United States Patent
Yamazaki et al.

(10) Patent No.: US 7,501,602 B2
(45) Date of Patent: Mar. 10, 2009

(54) OPTICAL PATH AXIS ALIGNING DEVICE OF LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 0 days.

(21) Appl. No.: 11/611,257

(22) Filed: Dec. 15, 2006

(65) Prior Publication Data

US 2007/0145025 A1   Jun. 28, 2007

(30) Foreign Application Priority Data

Dec. 28, 2005   (JP)   .............................. 2005-378954

(51) Int. Cl.
  *B23K 26/04* (2006.01)
(52) U.S. Cl. ................... 219/121.74; 356/153; 356/400
(58) Field of Classification Search ............ 219/121.74, 219/121.83; 356/153, 154, 399, 400, 401
See application file for complete search history.

(56) References Cited

U.S. PATENT DOCUMENTS

| | | | | |
|---|---|---|---|---|
| 3,813,511 | A | * | 5/1974 | Staal ...................... 219/121.85 |
| 4,530,602 | A | * | 7/1985 | Pomphrey, Jr. .............. 356/153 |
| 4,618,759 | A | * | 10/1986 | Muller et al. .......... 219/121.75 |
| 4,840,483 | A | * | 6/1989 | Haffner ....................... 356/153 |
| 4,910,378 | A | * | 3/1990 | Arai ....................... 219/121.74 |
| 4,918,284 | A | * | 4/1990 | Weisz ................... 219/121.83 |
| 4,998,260 | A | * | 3/1991 | Taniura ....................... 372/107 |
| 5,034,618 | A | | 7/1991 | Akeel et al. |
| 5,048,953 | A | * | 9/1991 | Kuo et al. ................... 356/153 |
| 5,506,675 | A | * | 4/1996 | Lopez et al. ................ 356/153 |
| 5,509,597 | A | * | 4/1996 | Laferriere .............. 219/121.62 |
| 5,536,916 | A | | 7/1996 | Kohari et al. |
| 6,528,762 | B2 | * | 3/2003 | Mayer ................... 219/121.83 |
| 6,615,099 | B1 | * | 9/2003 | Muller et al. ............... 700/166 |

(Continued)

FOREIGN PATENT DOCUMENTS

EP   0 304 664   3/1989

(Continued)

OTHER PUBLICATIONS

European Search Report for corresponding Application No. 06405535.3 dated Apr. 23, 2007.

*Primary Examiner*—Geoffrey S Evans
(74) *Attorney, Agent, or Firm*—Renner, Otto, Boisselle & Sklar, LLP

(57) ABSTRACT

A device for improving the efficiency of operation for aligning the optical axis of mirrors disposed in an optical path for laser transmission in a laser beam machine. The laser beam output from a laser oscillator of a laser beam machine is transmitted via multiple mirrors disposed in the optical path thereof to a torch. A mirror for receiving the laser beam from the mirror is removed and a laser beam detecting device is attached in replacement thereof. The laser beam is passed through a cross-shape target, a portion of which is branched and taken as image by a laser beam detecting picture element. The operator operates adjusting screws and to change the tilt angle of the mirror while watching image data, so as to align the optical axis of the laser beam.

3 Claims, 9 Drawing Sheets

U.S. PATENT DOCUMENTS

| | | | |
|---|---|---|---|
| 6,693,272 B2 * | 2/2004 | Adachi et al. | 356/153 |
| 2005/0215986 A1 * | 9/2005 | Chernyak et al. | 606/5 |

FOREIGN PATENT DOCUMENTS

| | | | |
|---|---|---|---|
| EP | 0 468 937 | | 1/1992 |
| GB | 2186973 A | * | 8/1987 |
| JP | 62-227588 | | 10/1987 |
| JP | 3-47689 A | * | 2/1991 |
| JP | 08-103881 | | 4/1996 |
| JP | 08-236847 | | 9/1996 |
| JP | 09-155578 | | 6/1997 |
| JP | 9-271971 A | * | 10/1997 |
| JP | 10-277765 | | 10/1998 |
| JP | 11-179579 | | 7/1999 |
| JP | 2000-343263 | | 12/2000 |

* cited by examiner

OPTICAL PATH AXIS ALIGNING DEVICE OF LASER BEAM MACHINE

The present application is based on and claims priority of Japanese patent application No. 2005-378954 filed on Dec. 28, 2005, the entire contents of which are hereby incorporated by reference.

BACKGROUND OF THE INVENTION

1. Field of the Invention

The present invention relates to an aligning device for aligning the optical path system of a laser beam machine.

2. Description of the Related Art

In a laser beam machine, the laser beam is transmitted from a laser oscillator to a machining torch, and a mirror so-called a mirror is used to change the transmission direction of the laser beam. In the transmission path (optical path) of the laser beam, the laser beam must be aligned so that it is parallel with the axis of movement of the laser beam machine and also passes the center of the mirror. This alignment operation is called a beam alignment operation.

In the beam alignment operation, since the laser beam is not a visible light, the center of the beam must be confirmed by disposing a cross-shape target at the center of a mirror holder and burning the shadow by the laser beam passing the cross-shape target on a cardboard or a plastic board placed at the rear of the target. This confirmation operation is called a burning operation.

In the beam alignment operation, while moving the axis of the laser beam machine, the center of the laser beam must be confirmed each time via the burning operation to perform alignment so that the laser beam and the machine axis are arranged in parallel and the laser beam is irradiated on the mirror. Since the current alignment method requires the burning to be performed each time the axis is moved, and the burning to be performed each time the mirror is aligned, the conventional beam alignment operation requires an extremely large number of alignment steps.

FIG. 6 is an explanatory view showing the basic structure of a laser beam machine.

The laser beam machine 1 comprises a work table 10 having a work $W_1$ placed thereon. A guide 12 is disposed on both sides of the work table 10, and a carriage 20 is disposed movably in the X-axis direction. On the carriage 20 is disposed a working head 30 capable of moving in the Y-axis direction, and the working head 30 supports the torch 40 so that it moves up and down in the Z-axis direction.

The laser oscillator 50 is fixed to the ground, and the oscillated laser beam LB has its optical axis changed via mirrors $M_1$, $M_2$, $M_3$, $M_4$ and $M_5$ to be supplied to the torch 40.

FIG. 7 is an expansion plan of the mirror arrangement.

Each mirror comprises a holder 60 for supporting the mirror, one pivot 70 and two adjusting screws 71 and 72 for adjusting the mounting angle of the mirror. By rotating the adjusting screws 71 and 72 and adjusting the tilt of the mirror, the optical axis of the laser beam LB can be aligned.

FIGS. 8 and 9 illustrate an aligning method called a burning method.

For example, it shows the method for aligning the optical axis of the laser beam LB transmitted from mirror $M_2$ to mirror $M_3$.

First, the mirror $M_3$ is removed from the holder 60, and a member having a cross-shape pole is attached to a round hole called a cross-shape target 80. Then, a target plate 90 is disposed at the rear portion of the cross-shape target 80. A member such as a plastic board or a cardboard capable of having a burned mark remain thereon when laser beam is irradiated is used as the target plate 90.

When a low-energy laser beam LB is irradiated from the laser oscillator in this state, the laser beam LB passing through the cross-shape target 80 leaves a burned mark (burning) $B_1$ on the target plate 90.

FIGS. 10A, 10B and 10C show the shapes of various burnings $B_1$.

FIG. 10B shows that the optical axis of the laser beam LB traveling from mirror $M_2$ to mirror $M_3$ is at a correct position, and FIGS. 10A and 10C respectively show that the optical axis is displaced.

FIG. 11 shows a method for aligning the optical path axis of the laser beam LB using the burning of the target plate mentioned above.

The operator sets the cross-shape target 80 and the target plate 90, outputs a low-energy laser beam LB from the laser oscillator, visually confirms the burning $B_1$ on the target plate 90, operates the adjusting screws 71 and 72, and generates the burning $B_1$ again. This operation is repeated until the burned mark corresponds to the center of the cross-shape target 80.

In the laser beam machine 1, the carriage 20 and the working head 30 are moved along the X axis and Y axis, so as to subject work $K_1$ and work $K_2$ to laser processing. Thus, the optical length between mirrors $M_2$ and $M_3$ or the optical length between mirrors $M_3$ and $M_4$ are changed constantly.

The operation for aligning the center position of the optical path axis of the laser beam irradiated on the mirror $M_3$ so that it corresponds to the center of the mirror at all the positions on the X axis requires an excessive number of process steps by the method described above.

SUMMARY OF THE INVENTION

The object of the present invention is to provide a device capable of facilitating the aligning of the mirror mentioned above.

In order to achieve the above object, the present invention provides an optical path axis aligning device of a laser beam machine having an optical path with multiple mirrors for transmitting a laser beam from a laser oscillator to a machining torch, comprising a laser beam detecting device attached to a mirror position to which the laser beam is irradiated; a personal computer for receiving laser beam data detected by the laser beam detecting device, subjecting the same to image processing, and displaying the same on a screen; and a mirror from which the laser beam is irradiated, the tilt angle of the mirror being aligned based on the data displayed on the personal computer.

Moreover, the laser beam detecting device comprises an adaptor for attaching the same to a center position of the laser beam machine; a beam splitter for splitting and branching the laser beam passing through the adapter; a beam absorber for absorbing a high-power beam split by the beam splitter; and a detecting element for receiving the laser beam passing an optical system for converting the other low-power beam split by the beam splitter to have a beam width and energy suitable for detection.

Further, the device can have a cross-shape target disposed at a center position of the machine, and when the laser beam passes the center position of the machine, it is possible to confirm that the laser beam has passed the center position of the laser beam machine by detecting an interference pattern of the laser beam by the laser beam detecting device.

Moreover, the device can also be arranged so that a mark enabling to determine the center position of the machine is set in advance on the display screen of the beam position of the laser beam detecting device without disposing a cross-shape target at the center position of the machine, which makes it possible to confirm via the display screen that the laser beam has passed the center position of the laser beam machine.

According to the present invention having the arrangements described above, it is possible to align the tilt of the lens while visually confirming the shape of the beam taken as image by the laser beam detecting device attached instead of the lens at the light receiving position of the mirror position subjected to alignment.

Therefore, the present invention enables to align the optical axis of the optical path of the laser beam having multiple mirrors in a short time.

DETAILED DESCRIPTION OF THE PREFERRED EMBODIMENTS

Figure 1:
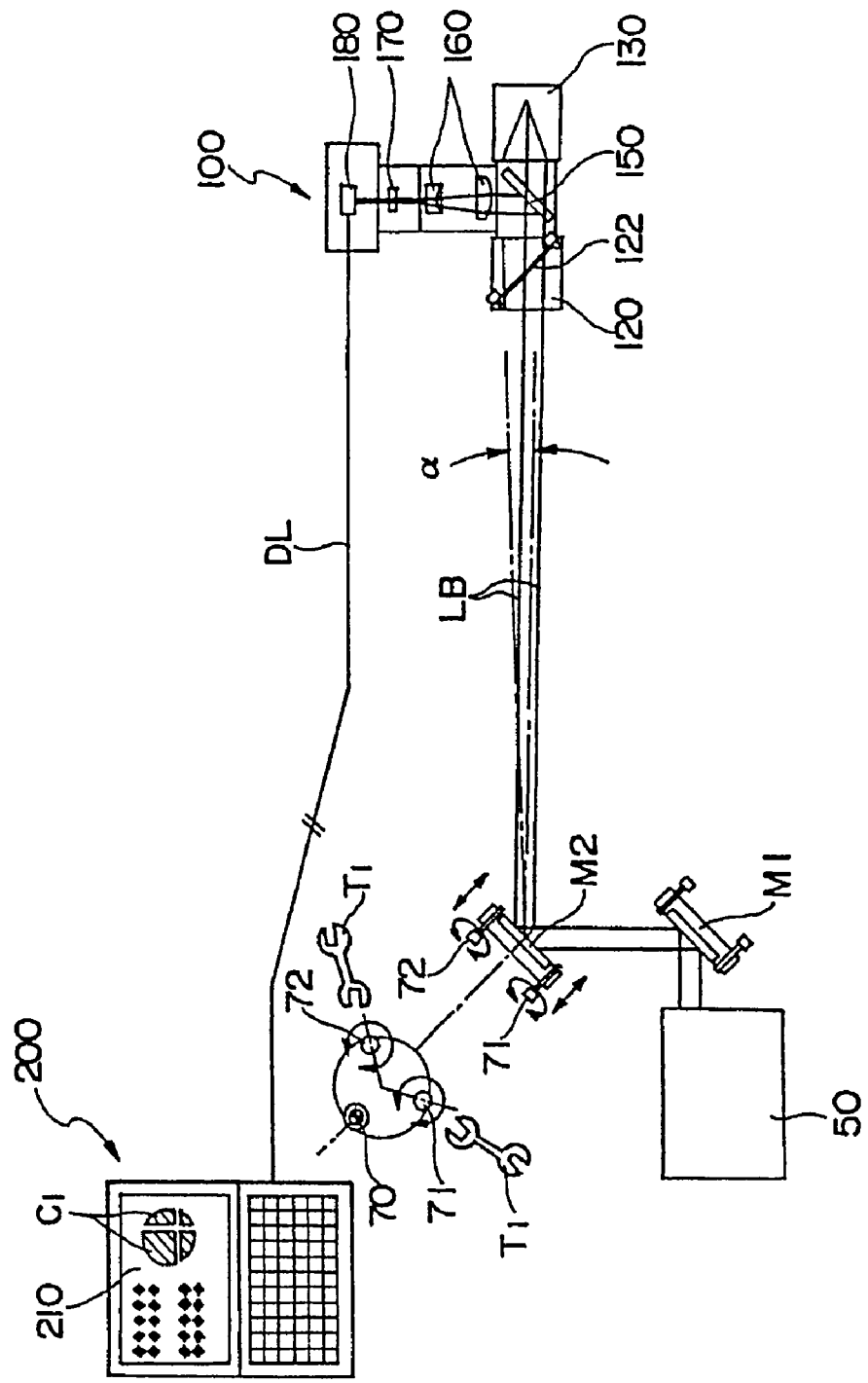
FIG. 1 is an explanatory view showing the outline of an aligning device of a laser beam optical path according to the present invention.
Figure 2:
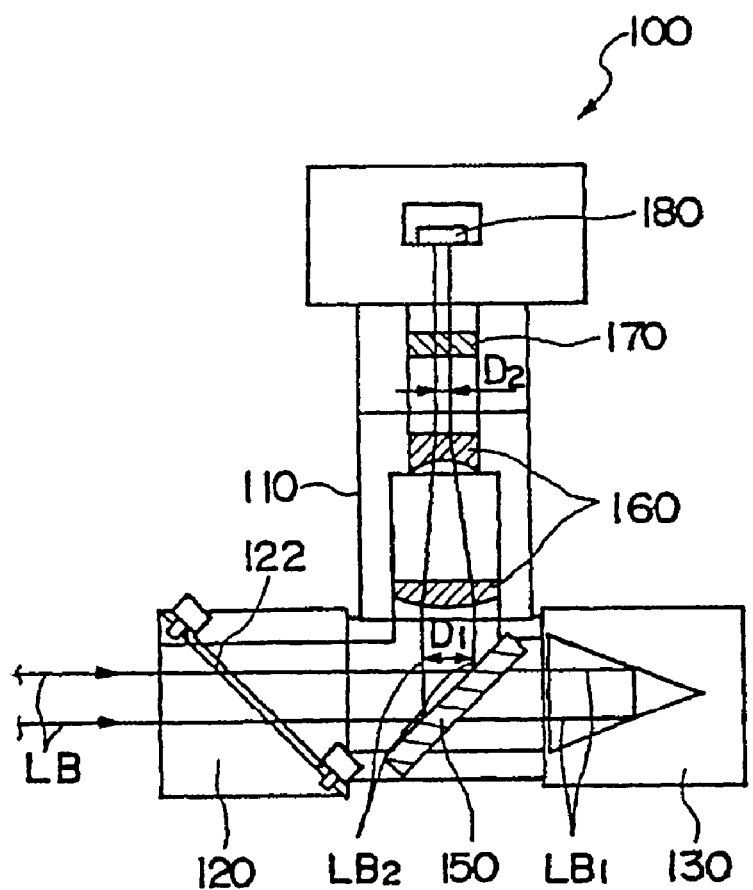
FIG. 2 is an explanatory view of a laser beam detecting device.

FIG. 1 is an explanatory view illustrating the outline of the optical path axis aligning device of a laser beam according to the present invention, and FIG. 2 is an explanatory view of a laser beam detecting device.

The optical axis aligning device of the laser beam according to the present invention comprises a laser beam detecting device 100 provided on a mirror unit of the optical system, and a personal computer 200 connected to the laser beam detecting device via a data transmission cable DL.

As also illustrated in FIG. 2, the laser beam detecting device 100 comprises a casing 110, and a target holder 120 positioned on the side from which the laser beam LB enters.

The target holder 120 supports a cross-shape target 122 similar to the aforementioned cross-shape target 80.

The laser beam passing through the cross-shape target 122 is irradiated on a beam splitter 150. The beam splitter 150 functions to split and branch the laser beam LB having intense energy.

The laser beam $LB_1$ passing through the beam splitter 150 is absorbed by a beam absorber 130 disposed at the rear.

The laser beam $LB_2$ branched via the beam splitter 150 passes through a beam condenser optical system 160 where the beam width $D_1$ is reduced to a beam width $D_2$ suitable for detection.

The beam for detection is then attenuated via a beam attenuation optical system 170, and enters a laser beam detecting picture element 180 where it is taken as image.

The cross-shape image data being taken is transmitted via the data transmission cable DL to the personal computer 200 disposed near the mirror $M_2$ to be aligned.

The personal computer 200 has stored therein an image analysis software, and displays on the screen 210 thereof a cross-shape target image $C_1$. When the operator turns the adjusting screws 71 and 72 using a tool $T_1$, the tilt angle of the mirror $M_2$ is changed and the angle α of the optical axis of the laser beam LB is also changed. By this change in angle of the optical axis, the cross-shape target image $C_1$ taken from the beam passing through the cross-shape target 122 is also changed. The operator adjusts the adjusting screws 71 and 72 while watching the cross-shape target image $C_1$ on the screen of the personal computer, and adjusts the tilt of the mirror $M_2$ so that the center of the cross corresponds to the center of the laser beam.

After attaching the laser beam detecting device 100 to the mirror position on the lower stream side of the mirror to be subjected to alignment, the operator can perform the aligning operation at the position of the mirror to be subjected to alignment.

Therefore, there is no need for the operator to move back and forth between the mirror subjected to alignment and the mirror position on the lower stream side thereof every time the burning is performed as in the prior art, and the number of steps required for performing alignment can be reduced significantly.

Furthermore, the data transmission between the laser beam detecting device 100 and the personal computer 200 can be performed via radio transmission instead of via cable.

Furthermore, by analyzing the image on the personal computer 200 and numerically converting the displacement of the optical axis, it becomes possible to present the quantity of alignment numerically to the operator.

Moreover, for sake of description, the taken image $C_1$ displayed on the screen 210 of the personal computer 200 is shown as a similar image as the prior art burning $B_1$, but according to the present invention, the laser beam having passed through the cross-shape target 122 passes the beam splitter 150, the beam condenser optical system 160, the beam attenuation optical system 170 and the like before being taken as image by the laser beam detecting picture element 180.

The distance from the cross-shape target 122 to the laser beam detecting picture element 180 is longer compared to the distance from the prior art cross-shape target 80 to the target plate 90. While the beam advances through this distance, the beams being split via the cross-shape target mutually interfere so that the beam is detected as interference light on the laser beam detecting image element 180.

Figure 3A:
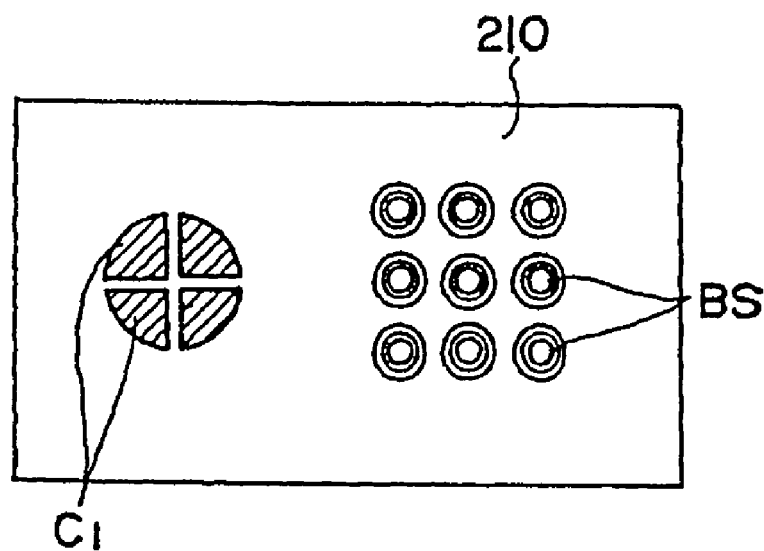
FIGS. 3A and 3B are explanatory views showing interference light patterns.
Figure 3B:
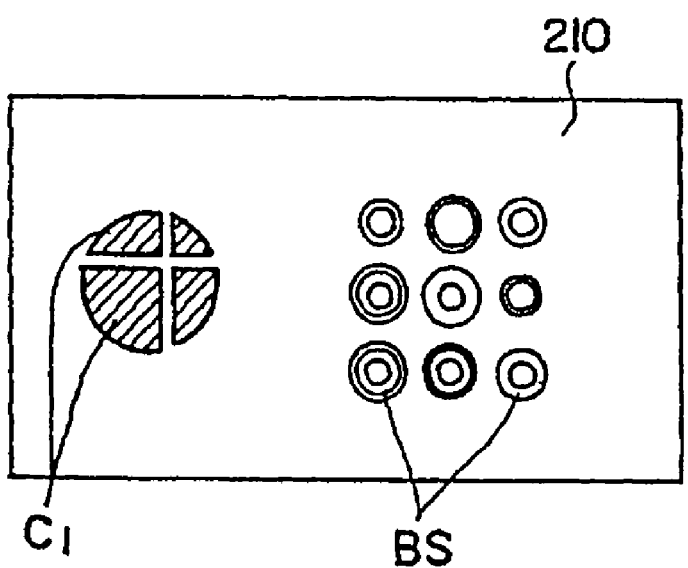

FIGS. 3A and 3B illustrate a state in which the interference light displayed on the screen 210 is patterned. The interference patterned image is displayed as an assembly of brilliance spots BS.

FIG. 3A having the brilliance spots BS distributed uniformly represents the state in which the laser beam LB corresponds to the center of the cross-shape target 122.

FIG. 3B having some brilliance spots BS stronger and some weaker than the others represents the state in which the laser beam LB is displaced from the center of the cross-shape target 122.

Figure 4:
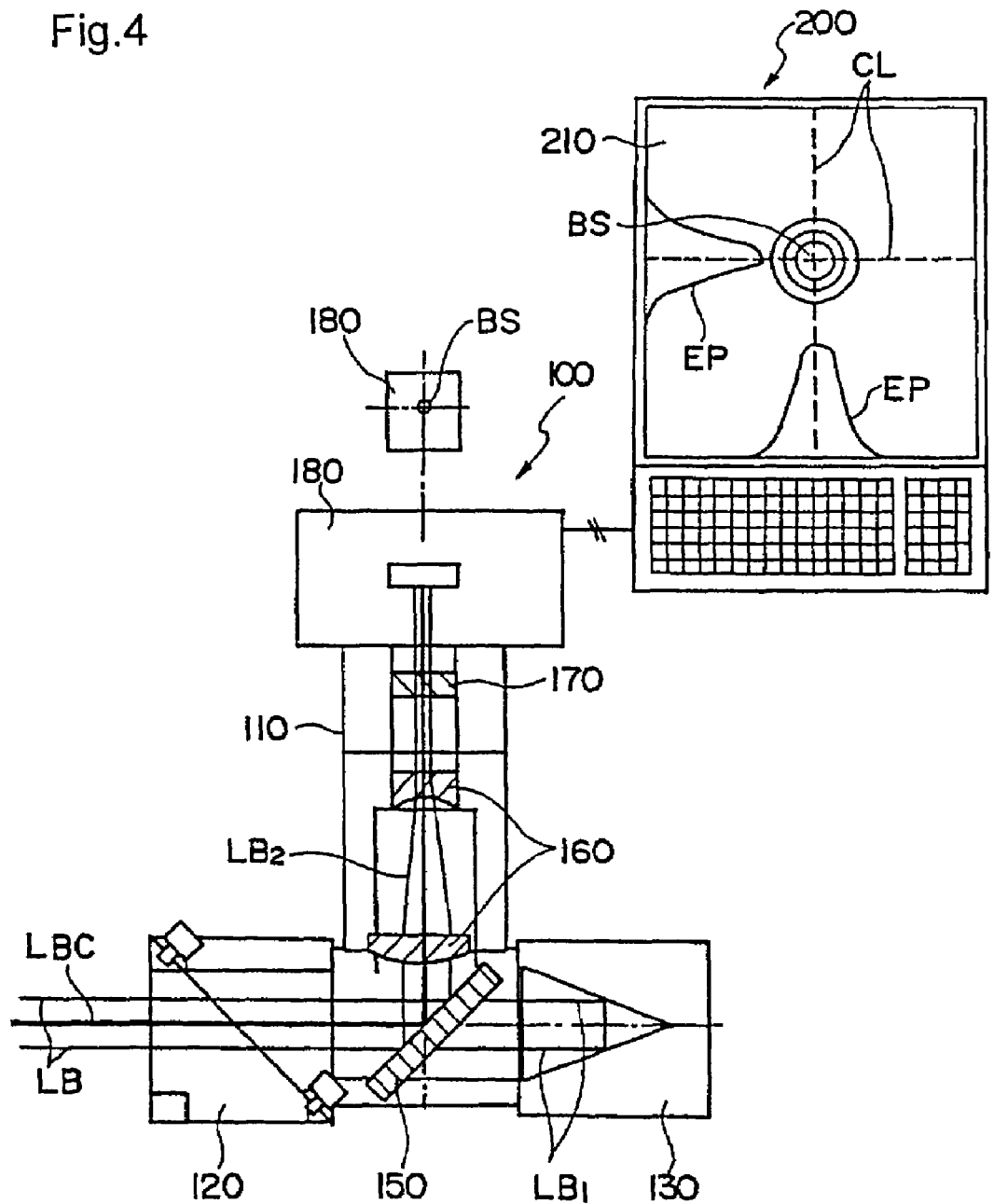
FIG. 4 is an explanatory view showing another embodiment of the present invention.

FIG. 4 is an explanatory view showing the optical path axis aligning device according to another embodiment of the present invention.

The present optical path axis aligning device does not use a cross-shape target placed in the optical path of the laser beam.

In other words, there is no cross-shape target attached to the target holder 120, and the center line LBC of the laser beam LB is irradiated on the beam splitter 150 directly without the interference of the cross-shape target.

The laser beam $LB_2$ being split and branched by the beam splitter 150 is passed through the beam condenser optical system 160 and attenuated by the beam attenuation optical system 170 before it enters the laser beam detecting image element 180 where it is taken as image.

The taken image is transmitted to the personal computer 200 and displayed on the screen 210.

Since the brilliance spot BS being taken and displayed does not provide an interference pattern since the laser beam LB has not passed through the cross-shape target with a cross-shape post, the energy density EP thereof shows a normal distribution, and the image is displayed as a concentric brilliance pattern.

A cursor line CL is displayed in advance on the screen 210 of the personal computer so that a cross is provided on the position corresponding to the center of the machine. Thus, the tilt of the mirror $M_2$ is adjusted by watching the screen and setting the center of the brilliance spot BS to correspond to the intersection of the cursor line CL.

Figure 5:
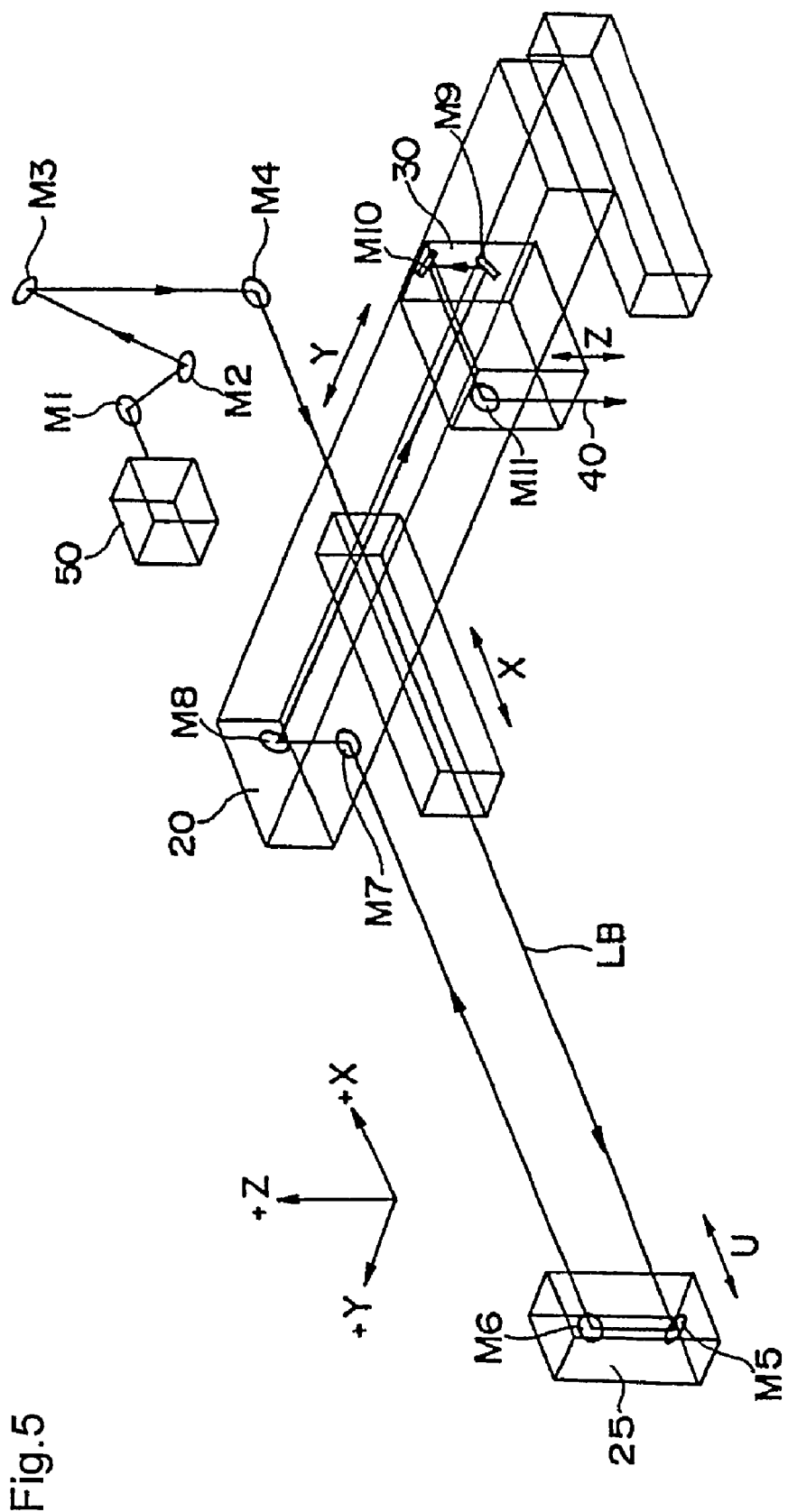
FIG. 5 is an explanatory view showing an optical path system of a laser beam machine.
Figure 6:
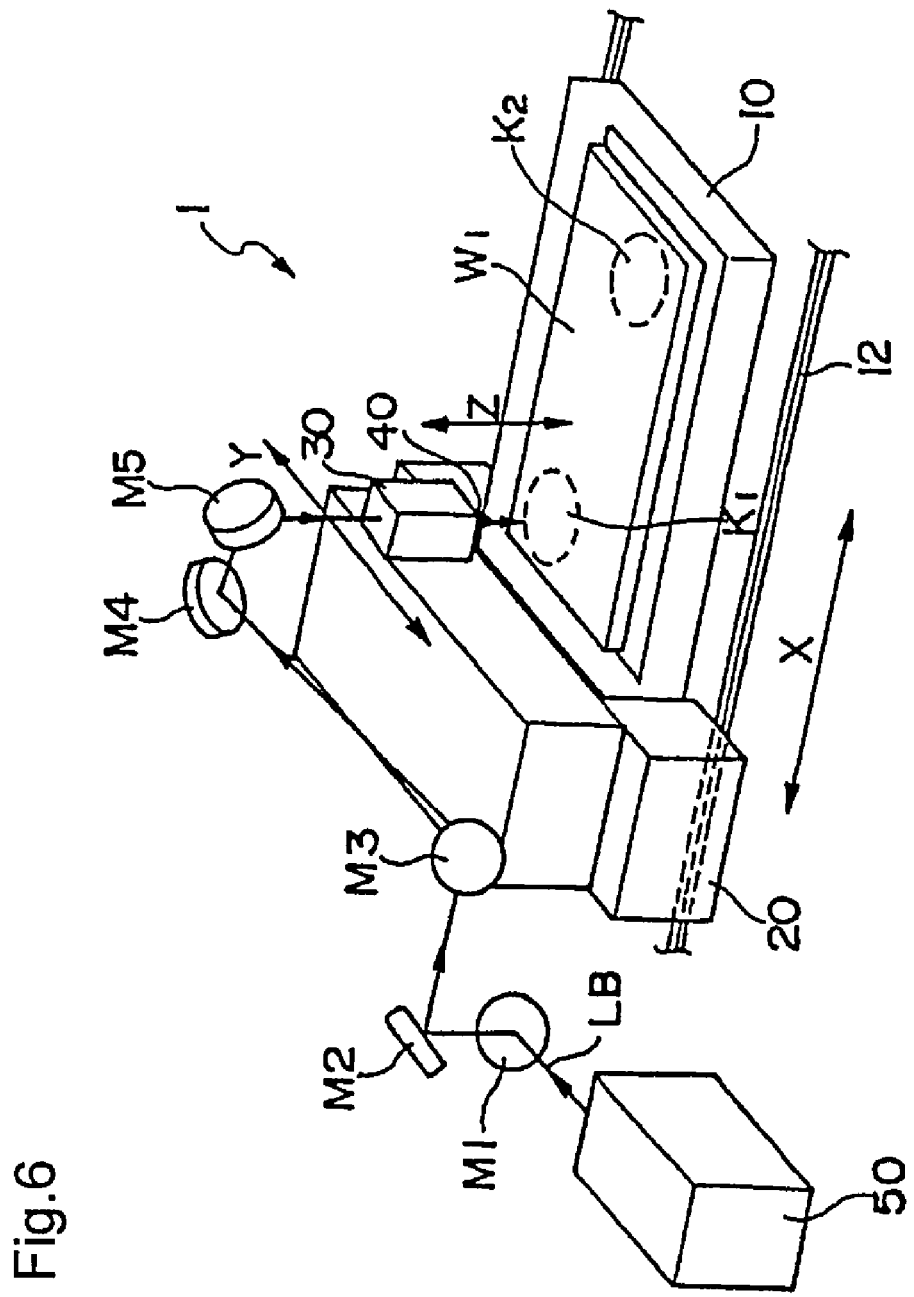
FIG. 6 is an explanatory view showing a basic structure of a laser beam machine.
Figure 7:
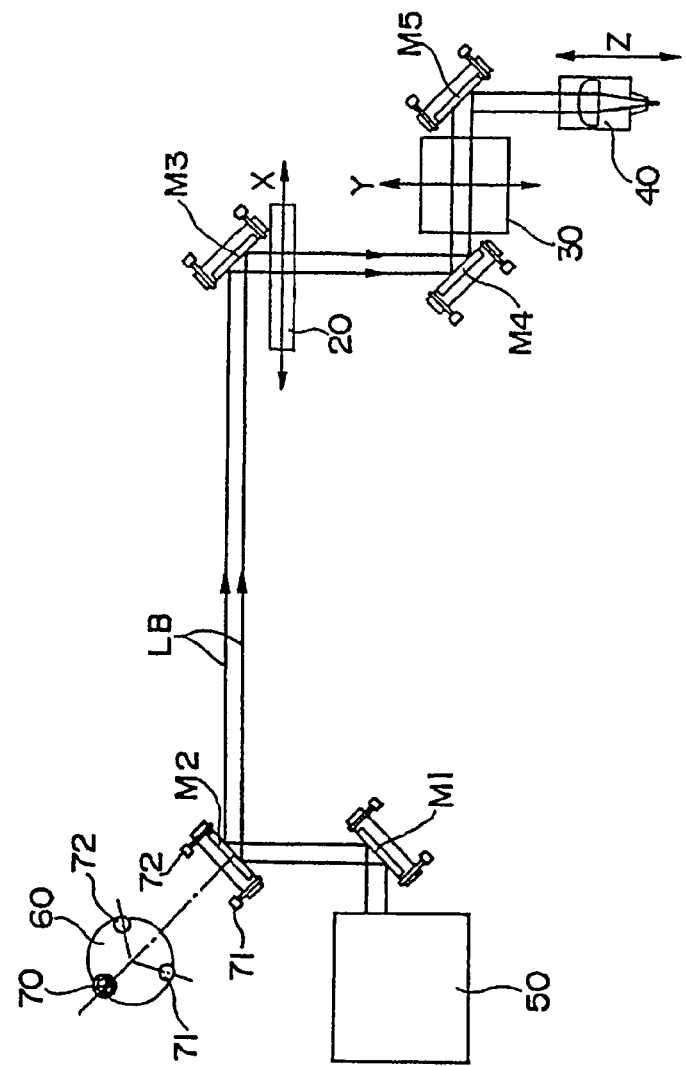
FIG. 7 is an expansion plan of the mirror arrangement.
Figure 8:
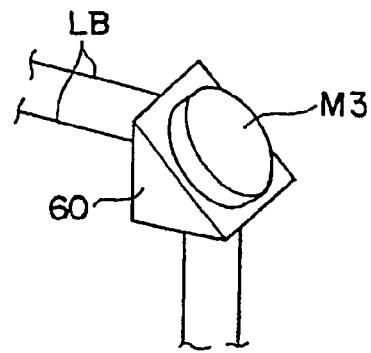
FIG. 8 is an explanatory view of the burning method.
Figure 9:
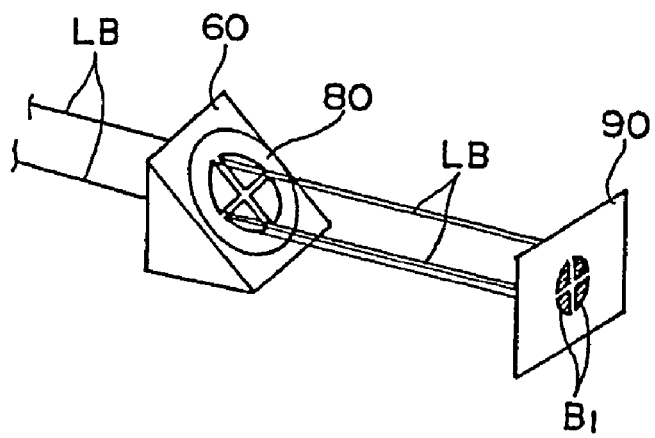
FIG. 9 is an explanatory view of the burning method.
Figure 10A:
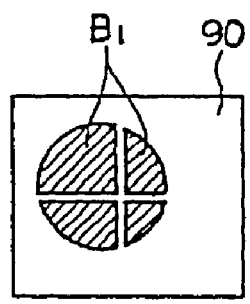
FIGS. 10A, 10B and 10C are explanatory views showing the shapes of the burning.
Figure 10B:
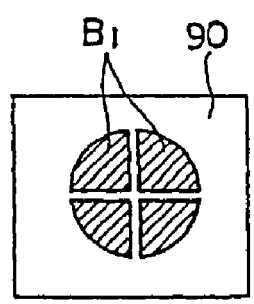
Figure 10C:
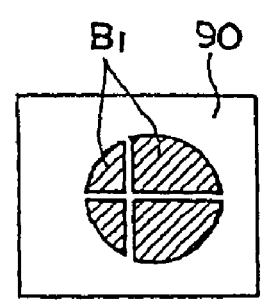
Figure 11:
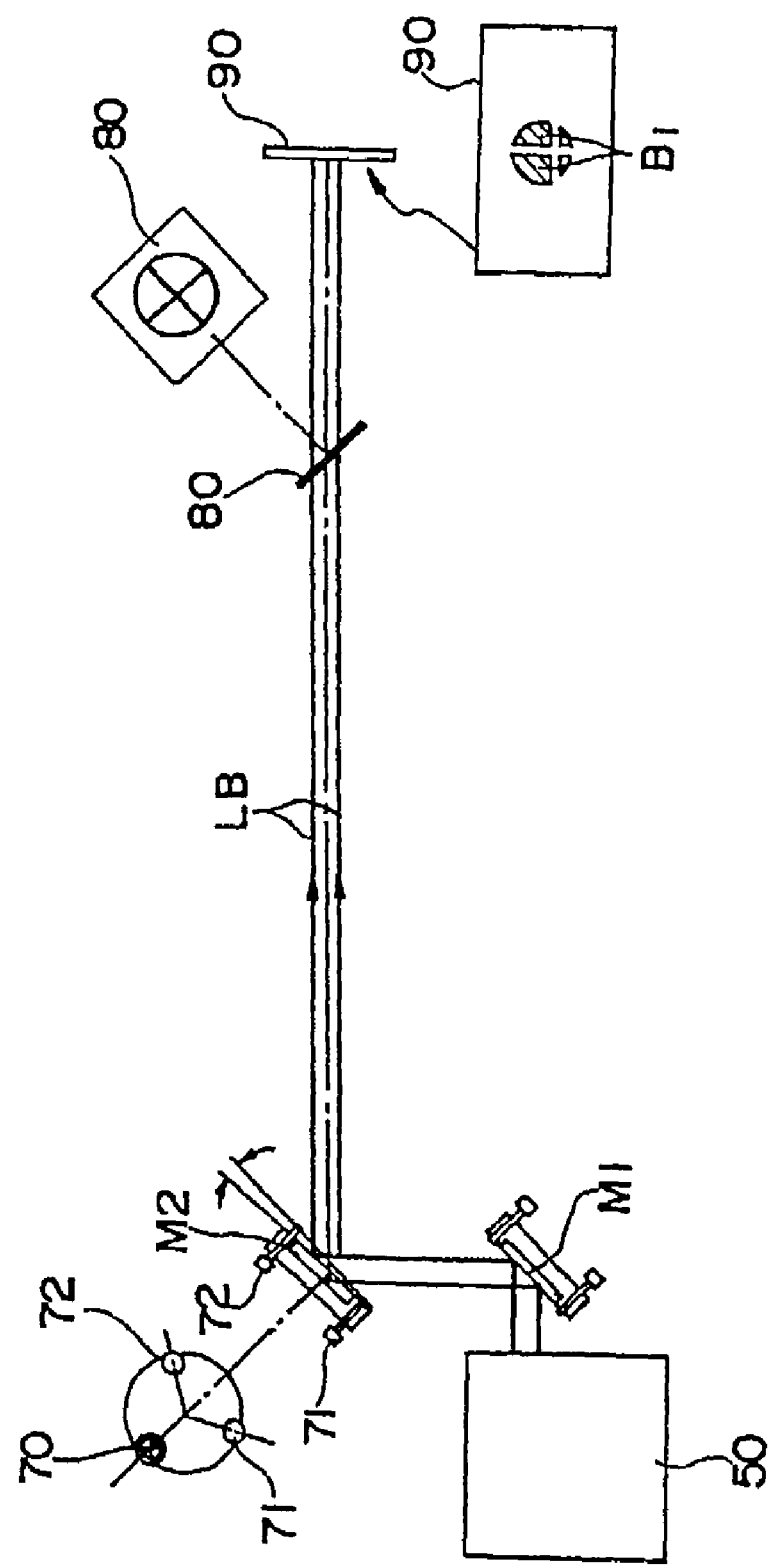
FIG. 11 is an explanatory view showing the method for aligning the optical path axis using the burning.

FIG. 5 is an explanatory view showing an example of the optical path system of a laser beam machine.

The laser beam machine comprises a carriage 20 that travels on an X axis, a working head 30 moving along a Y axis on the carriage 20, and a torch 40 moving up and down in the Z-axis direction with respect to the working head 30. The machine further comprises an optical length correction carriage 25 that travels on a U axis parallel to the X axis. The optical length correction carriage 25 moves at half the speed of the carriage 20 in the same direction as the carriage 20.

By adopting the optical length correction carriage 25, the optical length from the laser oscillator 50 to the torch 40 can be maintained constant.

In the optical path system of the laser beam machine, the laser beam LB from the laser oscillator 50 travels via eleven mirrors, from mirror $M_1$ to mirror $M_{11}$, and reaches the torch 40.

Therefore, for example, in order to align the optical axis from mirror $M_4$ to mirror $M_5$, the laser beam detecting device 100 of the present invention is disposed at the position of the mirror $M_5$, and the operator adjusts the adjusting screws of the mirror $M_4$ while watching the image on the personal computer 200 located near the mirror $M_4$ to align the optical axis. The optical axis to the torch 40 is aligned by performing the same process sequentially.

What is claimed is:

1. An optical path axis aligning device of a laser beam machine having an optical path with multiple mirrors for transmitting a laser beam from a laser oscillator to a machining torch, comprising:

a laser beam detecting device located at a mirror position to which the laser beam is irradiated;

a personal computer for receiving laser beam data detected by the laser beam detecting device, subjecting the same to image processing, and displaying the same on a screen; and a mirror from which the laser beam is irradiated, the tilt angle of the mirror being aligned based on the data displayed on the personal computer, wherein the laser beam detecting device comprises:

an adaptor for attaching the laser beam detecting device at a desired center position of the optical path of the laser beam machine;

a beam splitter for splitting and branching the laser beam passing through the adapter;

a beam absorber for absorbing a high-power beam split by the beam splitter; and a detecting element for receiving the laser beam passing an optical system for converting a low-power beam split by the beam splitter to have a beam width and energy suitable for detection.

2. The optical path axis aligning device of a laser beam machine according to claim 1, wherein a mark enabling to determine the desired center position of the optical path of the machine is set in advance on the display screen of the beam position of the laser beam detecting device without disposing a cross-shape target at the center position, which makes it possible to confirm via the display screen that the laser beam has passed the desired center position.

3. An optical path axis aligning device of a laser beam machine having an optical path with multiple mirrors for transmitting a laser beam from a laser oscillator to a machining torch, comprising:

a laser beam detecting device located at a mirror position to which the laser beam is irradiated;

a personal computer for receiving laser beam data detected by the laser beam detecting device, subjecting the same to image processing, and displaying the same on a screen; and a mirror from which the laser beam is irradiated, the tilt angle of the mirror being aligned based on the data displayed on the personal computer, wherein a cross-shape target is disposed at a desired center position of the optical path of the machine, and when the laser beam passes the center position, it is possible to confirm that the laser beam has passed the desired center position by detecting an interference pattern of the laser beam by the laser beam detecting device.

* * * * *